US012260566B2

(12) United States Patent
Huang et al.

(10) Patent No.: US 12,260,566 B2
(45) Date of Patent: Mar. 25, 2025

(54) METHOD FOR MANAGING TRACKING DEVICES, DEVICE MANAGER, AND COMPUTER READABLE STORAGE MEDIUM

(71) Applicant: HTC Corporation, Taoyuan (TW)

(72) Inventors: Sheng-Kun Huang, Taoyuan (TW); Jia-Yau Shiau, Taoyuan (TW)

(73) Assignee: HTC Corporation, Taoyuan (TW)

( * ) Notice: Subject to any disclaimer, the term of this patent is extended or adjusted under 35 U.S.C. 154(b) by 446 days.

(21) Appl. No.: 17/715,038

(22) Filed: Apr. 7, 2022

(65) Prior Publication Data

US 2023/0326045 A1 Oct. 12, 2023

(51) Int. Cl.
*G06T 7/292* (2017.01)
*G06T 7/70* (2017.01)
*G06V 40/10* (2022.01)

(52) U.S. Cl.
CPC ................ *G06T 7/292* (2017.01); *G06T 7/70* (2017.01); *G06V 40/10* (2022.01); *G06T 2207/30196* (2013.01)

(58) Field of Classification Search
CPC . G06T 7/292; G06T 7/70; G06T 2207/30196; G06T 7/246; G06V 40/10; H04N 7/183; G06F 16/29
USPC .......................................................... 382/103
See application file for complete search history.

(56) References Cited

U.S. PATENT DOCUMENTS 9,965,689 B2 * 5/2018 dos Santos Mendonca ................ G01C 21/1652
10,070,256 B1 * 9/2018 Puppala .................... G01S 5/01
10,506,386 B1 * 12/2019 de la Broise ......... H04W 4/029
12,031,837 B2 * 7/2024 Zou .................... G01C 21/3848
2017/0134898 A1 * 5/2017 Vega ..................... H04W 4/023
2018/0184286 A1 * 6/2018 Patterson ............. H04W 12/02
2018/0241827 A1 * 8/2018 Haney ..................... H04W 4/10
2023/0016477 A1 * 1/2023 Klinkner ............... H04W 12/08
2023/0260384 A1 * 8/2023 Haines .................... H04W 4/12 455/411

FOREIGN PATENT DOCUMENTS

CN 109154501 1/2019
CN 109154501 A * 1/2019 ............ G01C 21/00

(Continued)

OTHER PUBLICATIONS

CN 109154501 A, Dos Santos Mendonca, P R et al., geometric matching of visual navigation system (Year: 2019), Jan. 4, 2019. All pages and figures.*

(Continued)

*Primary Examiner* — Mahendra R Patel
(74) *Attorney, Agent, or Firm* — JCIPRNET

(57) ABSTRACT

The embodiments of the disclosure provide a method for managing tracking devices, a device manager, and a computer readable storage medium. The method includes: receiving a local map corresponding to each of a plurality of tracking devices and accordingly generating a shared map; obtaining a pose ambiguity status corresponding to each of the tracking devices; determining at least one first specific device among the tracking devices based on the pose ambiguity status corresponding to each of the tracking devices; and disabling at least one function of the at least one first specific device.

19 Claims, 4 Drawing Sheets

310
312
302
301
399a
399b
303
300

(56) References Cited

FOREIGN PATENT DOCUMENTS

| | | | |
|---|---|---|---|
| CN | 110070615 | 7/2019 | |
| CN | 110070615 A * | 7/2019 | ......... G06K 9/00664 |

OTHER PUBLICATIONS

CN 110070615 A, Yang, Yi et al., A panoramic visual SLAM method based on multi-camera coordinated (Year: 2019), Jul. 30, 2019. All pages and figures.*

"Office Action of Taiwan Counterpart Application", issued on Mar. 16, 2023, p. 1-p. 8.

* cited by examiner

METHOD FOR MANAGING TRACKING DEVICES, DEVICE MANAGER, AND COMPUTER READABLE STORAGE MEDIUM

BACKGROUND OF THE INVENTION

1. Field of the Invention

The disclosure generally relates to a tracking mechanism, in particular, to a method for managing tracking devices, a device manager, and a computer readable storage medium.

2. Description of Related Art

See FIG. 1A, which shows a scenario of performing outside-in tracking with one tracking device. In FIG. 1A, the tracking device 101 may be used to capture images of an object 199 (e.g., a human body) and performing the outside-in tracking based on the images to obtain the pose of the object 199 (i.e., the pose of the human body). However, in some cases where a part of the object 199 (e.g., the lower body of the human body) is occluded by an obstacle 110, the tracking device 101 in FIG. 1A may not achieve satisfying pose tracking performance.

See FIG. 1B, which shows a scenario of performing outside-in tracking with multiple tracking devices. In FIG. 1B, multiple tracking devices 101-103 can be deployed to solve the problem mentioned in FIG. 1A. In this case, it is important to decide which of the tracking devices 101-103 can be used to track the object 199.

SUMMARY OF THE INVENTION

Accordingly, the present invention is directed to a method for managing tracking devices, a device manager, and a computer readable storage medium, which can be used to solve the above technical problem.

The embodiments of the disclosure provide a method for managing tracking devices. The method includes: receiving, by a device manager, a local map corresponding to each of a plurality of tracking devices and accordingly generating a shared map; obtaining, by the device manager, a pose ambiguity status corresponding to each of the tracking devices; determining, by the device manager, at least one first specific device among the tracking devices based on the pose ambiguity status corresponding to each of the tracking devices; and disabling, by the device manager, at least one function of the at least one first specific device.

The embodiments of the disclosure provide a device manager including a storage circuit and a processor. The storage circuit stores a program code. The processor is coupled to the storage circuit and accesses the program code to perform: receiving a local map corresponding to each of a plurality of tracking devices and accordingly generating a shared map; obtaining a pose ambiguity status corresponding to each of the tracking devices; determining at least one first specific device among the tracking devices based on the pose ambiguity status corresponding to each of the tracking devices; and disabling at least one function of the at least one first specific device.

The embodiments of the disclosure provide a non-transitory computer readable storage medium, the computer readable storage medium recording an executable computer program, the executable computer program being loaded by a device manager to perform steps of: receiving a local map corresponding to each of a plurality of tracking devices and accordingly generating a shared map; obtaining a pose ambiguity status corresponding to each of the tracking devices; determining at least one first specific device among the tracking devices based on the pose ambiguity status corresponding to each of the tracking devices; and disabling at least one function of the at least one first specific device.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1B:
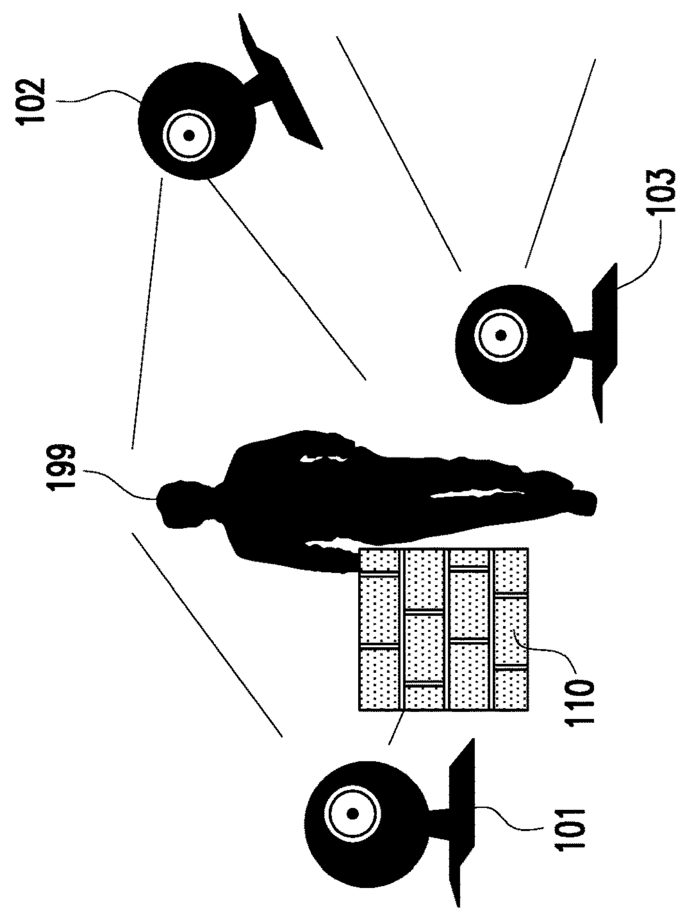
FIG. 1B shows a scenario of performing outside-in tracking with multiple tracking devices.
Figure 1A:
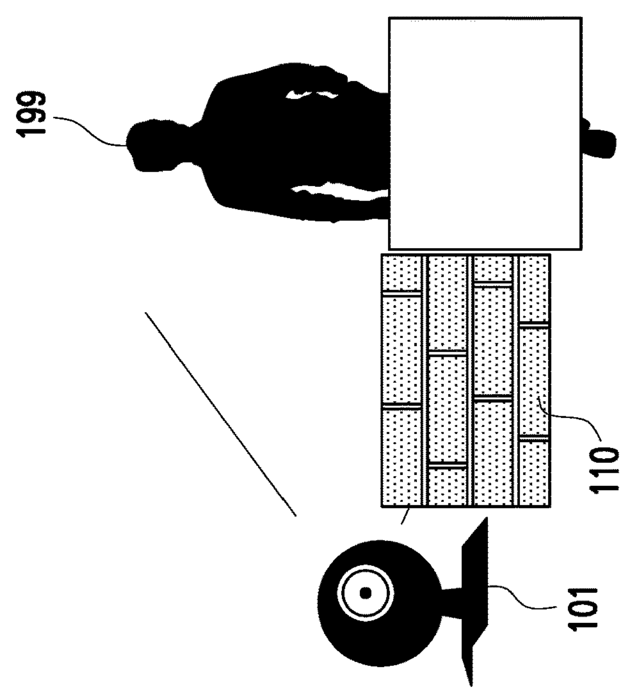
FIG. 1A shows a scenario of performing outside-in tracking with one tracking device.

Reference will now be made in detail to the present preferred embodiments of the invention, examples of which are illustrated in the accompanying drawings. Wherever possible, the same reference numbers are used in the drawings and the description to refer to the same or like parts.

Figure 2:
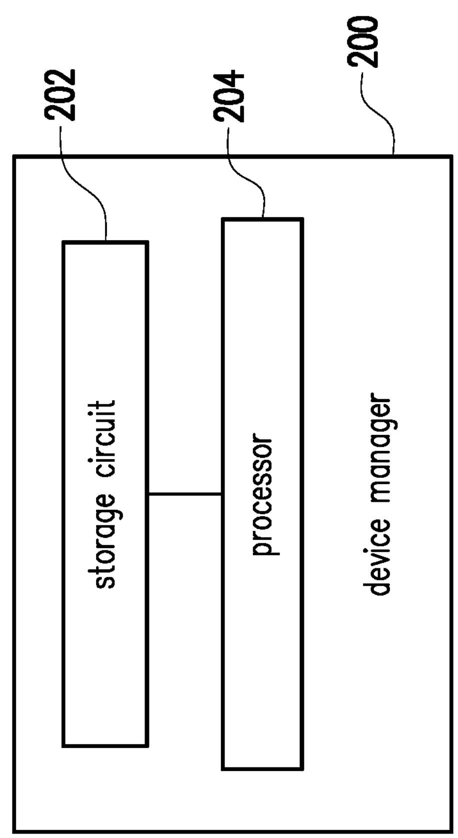
FIG. 2 shows a functional diagram of a device manager according to an embodiment of the disclosure.

See FIG. 2, which shows a functional diagram of a device manager according to an embodiment of the disclosure. In FIG. 2, the device manager 200 includes a storage circuit 202 and a processor 204. The storage circuit 202 is one or a combination of a stationary or mobile random access memory (RAM), read-only memory (ROM), flash memory, hard disk, or any other similar device, and which records a program code and/or a plurality of modules that can be executed by the processor 204.

The processor 204 is coupled with the storage circuit 202, and the processor 204 may be, for example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like.

In various embodiments, the device manager 200 can be used to manage one or more electronic devices collectively used to perform outside-in tracking mechanism. In one embodiment, the electronic devices include, but not limited to, one or more tracking devices and/or head-mounted displays (HMDs).

In one embodiment, the tracking devices can be equipped with cameras and image processors. In one embodiment, the camera on the tracking device can be used to perform image-capturing function for capturing images of the to-be-tracked objects. In addition, the image processor on the tracking device can be used to perform a tracking function for tracking the pose of the objects. For example, when the considered to-be-tracked object is a human body, the image processor may be used to detect the joint points on the human body in the images captured by the cameras and accordingly determine the pose of the human body, but the disclosure is not limited thereto. In other embodiments, the to-be-tracked object can be other kind of moving objects, such as various animals or moving devices.

In one embodiment, the tracking devices can be disposed in a specific field (e.g., a room or other particular space) for collectively tracking the objects moving in the specific field.

Figure 3:
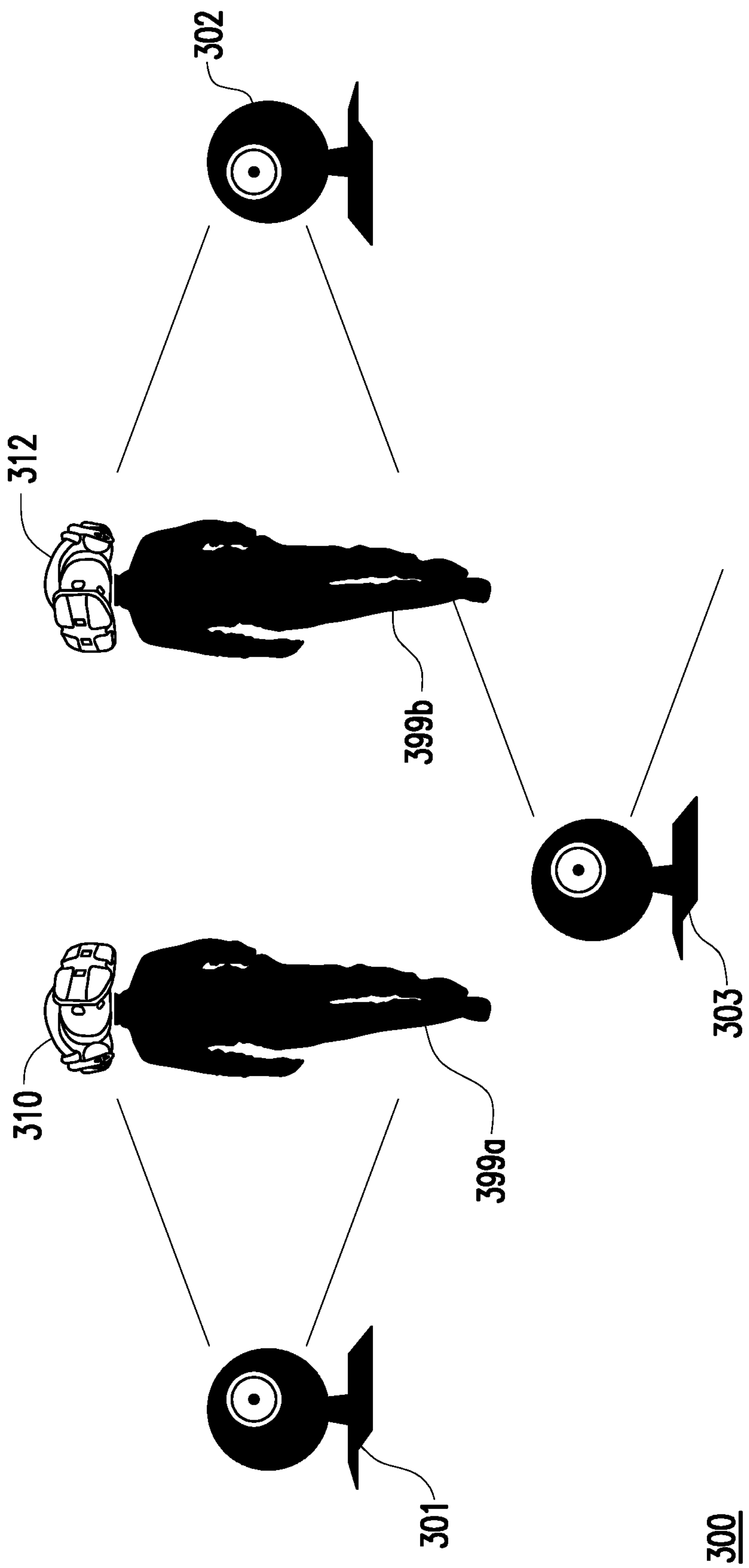
FIG. 3 shows a scenario of tracking objects in a specific field by using tracking devices according to an embodiment of the disclosure.

See FIG. 3, which shows a scenario of tracking objects in a specific field by using tracking devices according to an embodiment of the disclosure. In FIG. 3, the tracking devices 301-303 can be deployed in a specific field 300 for tracking the poses of the to-be-tracked objects 399*a*, 399*b*. In the embodiment, the to-be-tracked objects 399*a*, 399*b* can be users wearing the HMDs 310, 312, wherein the users may be simultaneously immersed in the same virtual environment (e.g., a virtual reality (VR) world) by viewing the contents provided by the HMDs. In one embodiment, the tracking results obtained by the tracking devices 301-303 may be, for example, provided to the HMDs 310, 312, such that the HMDs 310, 312 can accordingly adjust the contents shown to the users, but the disclosure is not limited thereto. In one embodiment, the HMDs 310, 312 can be standalone HMDs which can generate contents for the user to see, but the disclosure is not limited thereto.

In some embodiments, the device manager 200 can be used to manage the tracking devices 301-302 by, for example, disabling/enabling some particular functions of the tracking devices.

In one embodiment, the HMDs 310, 312 can be regarded as a part of the tracking devices managed by the device manager 200. In one embodiment, the device manager 200 is implemented as one of the HMDs 310, 312, and the tracking devices 301-303. In one embodiment, the device manager 200 can be implemented as another device (e.g., a computer and/or a smart device) independent from the devices shown in FIG. 3, but the disclosure is not limited thereto.

In one embodiment, the tracking results obtained by the tracking devices may be, for example, provided to some other electronic devices for further processing/presenting. For example, the tracking results (e.g., the skeleton formed by connecting the joint points on a human body) can be provided to a particular display for the display to show, but the disclosure is not limited thereto.

In the embodiments of the disclosure, the processor 204 accesses the modules and/or the program code stored in the storage circuit 202 to implement the method for managing tracking devices provided in the disclosure, which would be further discussed in the following.

Figure 4:
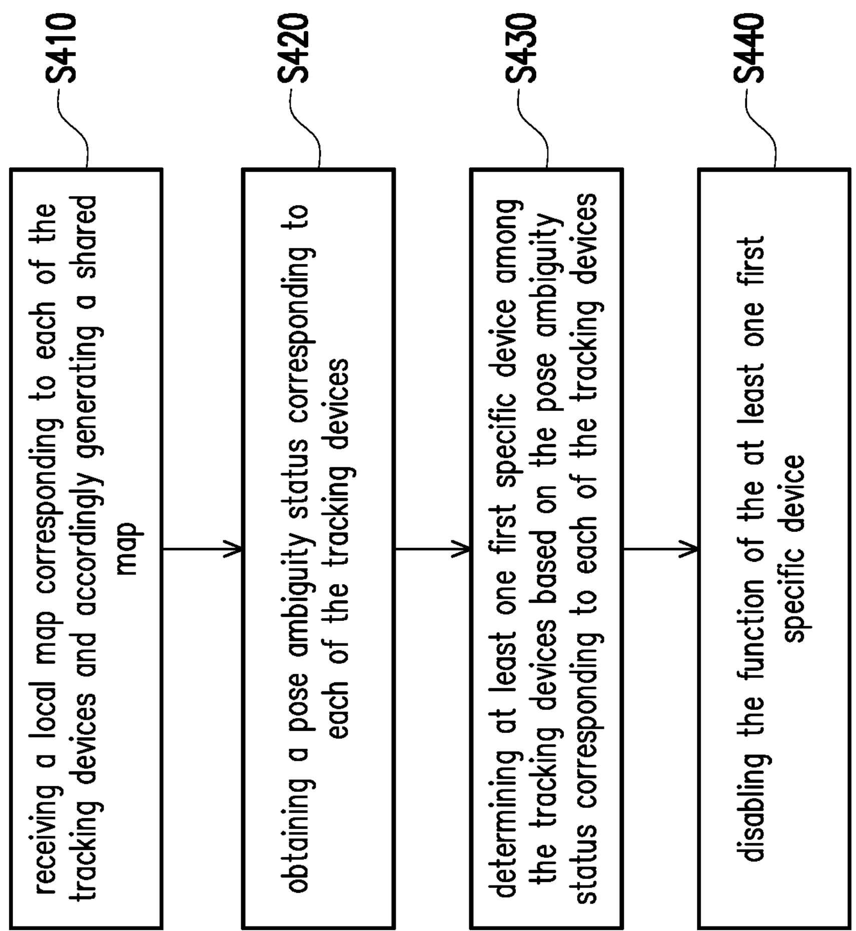
FIG. 4 shows a flow chart of the method for managing tracking devices according to an embodiment of the disclosure.

See FIG. 4, which shows a flow chart of the method for managing tracking devices according to an embodiment of the disclosure. The method of this embodiment may be executed by the device manager 200 in FIG. 2, and the details of each step in FIG. 4 will be described below with the components shown in FIG. 2. In addition, the scenario in FIG. 3 would be used as an example for better explaining the concept of FIG. 4.

In step S410, the processor 204 receives a local map corresponding to each of the tracking devices 301-303 and accordingly generating a shared map. In one embodiment, each of the tracking devices 301-303 can perform simultaneous localization and mapping (SLAM) to construct their own local map (e.g., a SLAM map). For example, the tracking device 301 can perform SLAM based on the captured images of the environment where the tracking device 301 locates. Accordingly, the tracking device 301 can obtain the feature points in the environment as the local map of the tracking device 301, but the disclosure is not limited thereto. Similarly, other tracking devices can perform SLAM to obtain the feature points in the environment as the local map of the corresponding tracking device.

In one embodiment, the HMDs 310, 312 can also perform SLAM to obtain the feature points in the environment as the local map of the corresponding HMD.

In one embodiment, each of the tracking devices 301-303 (and the HMDs 310, 312) provides its own local map to the device manager 200. In one embodiment, each of the tracking devices 301-303 (and the HMDs 310, 312) can provide its own local map to one device of the tracking devices 301-303 and the HMDs 310, 312, and this device can forward the local maps of the tracking devices 301-303 and the HMDs 310, 312 to the device manager 200, but the disclosure is not limited thereto.

In one embodiment, after receiving the local maps corresponding to the tracking devices 301-303 (and the HMDs 310, 312), the processor 204 aligns the local maps to generate the shared map. For example, the processor 204 can obtain a plurality of first feature points in a first local map corresponding to the tracking device 301 and obtaining a plurality of second feature points in a second local map corresponding to the tracking device 302. Next, the processor 204 determines a plurality of shared feature points between the first feature points and the second feature points. In one embodiment, the processor 204 regards the feature points that simultaneously belong to the first feature points and the second feature points as the shared feature points. Accordingly, the processor 204 constructs the shared map based on the shared featured points. Detailed discussions about constructing the shared map can be referred to "Lajoie, Pierre-Yves, et al. "Towards Collaborative Simultaneous Localization and Mapping: a Survey of the Current Research Landscape." (2021).", which would not be repeated herein.

In other embodiments, the processor 204 can find out the feature points that simultaneously belong to a part or all of the received local maps as the shared feature points and accordingly construct the shared map, but the disclosure is not limited thereto.

In one embodiment, the processor 204 provides the shared map to the tracking devices 301-303 (and the HMDs 310, 312) after constructing the shared map, such that the tracking devices 301-303 (and the HMDs 310, 312) can know the device location of each of the tracking devices 301-303 (and the HMDs 310, 312) in the shared map.

In step S420, the processor 204 obtains a pose ambiguity status corresponding to each of the tracking devices 301-303. In one embodiment, the pose ambiguity status corresponding to one tracking device comprises an ambiguity of this tracking device regarding tracking a pose of at least one object (e.g., the objects 399*a*, 399*b*).

For better understanding, the tracking device 301 would be used as an example, and people with ordinary skills in the art should be able to understand the operations performed by other tracking devices according to the following teachings.

In a first embodiment, the pose ambiguity status corresponding to the tracking device 301 is characterized by a tracking confidence of the tracking device 301 regarding the objects 399*a*, 399*b*. In one embodiment, when the image processor on the tracking device 301 performs the tracking function to track the poses of the objects 399*a*, 399*b*, the image processor can provide a tracking confidence related to the performance of tracking each of the objects 399*a*, 399*b*.

For example, if the image processor is confident of the performance of tracking the object 399*a*, the related tracking confidence would be high. On the other hand, if the image processor is not confident of the performance of tracking the object 399*a*, the related tracking confidence would be relatively low, but the disclosure is not limited thereto.

In a second embodiment, the pose ambiguity status corresponding to the tracking device 301 can be characterized by a captured part of each of the object 399*a*, 399*b* in the image captured by the camera of the tracking device 301. In general, the more of the body of the to-be-tracked object is captured in the image, the tracking accuracy is more likely to be good. Taking the object 399*a* as an example, if the captured part of the object 399*a* is near the whole body of the object 399*a* (i.e., the object 399*a* is less occluded), it represents that the tracking device 301 is highly possible to accurately track the pose of the object 399*a*. On the other hand, if the captured part of the object 399*a* is only a small part of the whole body of the object 399*a* (e.g., the object 399*a* may be occluded), it represents that the tracking device 301 is less possible to accurately track the pose of the object 399*a*.

In a third embodiment, the pose ambiguity status corresponding to the tracking device 301 can be characterized by a number of joint points of each of the objects 399*a*, 399*b* recognized in the image. In general, the more of the joint points of the to-be-tracked object is recognized in the image, the tracking accuracy is more likely to be good. Taking the object 399*a* as an example, if the number of the recognized joint points of the object 399*a* is near a predetermined number (e.g., 25), it represents that the tracking device 301 is highly possible to accurately track the pose of the object 399*a*. On the other hand, if the number of the recognized joint points of the object 399*a* is only a few (e.g., 5), it represents that the tracking device 301 is less possible to accurately track the pose of the object 399*a*.

In a fourth embodiment, the pose ambiguity status corresponding to the tracking device 301 can be characterized by a proportion of the objects 399*a*, 399*b* relative to the image. In general, the more of the proportion of the whole body of the to-be-tracked object relative to the image, the tracking accuracy is more likely to be good. Taking the object 399*a* as an example, if the proportion of the whole body of the object 399*a* relative to the image is high, it represents that the tracking device 301 is highly possible to accurately track the pose of the object 399*a*. On the other hand, if the proportion of the whole body of the object 399*a* relative to the image is low, it represents that the tracking device 301 is less possible to accurately track the pose of the object 399*a*.

In other embodiments, the pose ambiguity status can be determined based on a combination of the teachings in two or more of the first embodiment to the fourth embodiment, but the disclosure is not limited thereto.

In one embodiment, each of the tracking devices 301-303 can provide their own pose ambiguity status to the device manager 200. In another embodiment, each of the tracking devices 301-303 can provide its own pose ambiguity status to one device of the tracking devices 301-303 (and the HMDs 310, 312), and this device can forward the pose ambiguities of the tracking devices 301-303 to the device manager 200, but the disclosure is not limited thereto.

In one embodiment, the processor 204 obtains the pose ambiguity status corresponding to each of the tracking devices 301-303 based on the shared map. For example, after receiving the pose ambiguity status determined by the tracking device 301, the processor 204 can determine the pose ambiguity status of, for example, the tracking device 302 based on the share map.

In one embodiment, the processor 204 can determine a relative position between the device locations of the tracking devices 301, 302. Next, the processor 204 can estimate the pose ambiguity status corresponding to the tracking device 302 based on the elative position between the device locations of the tracking devices 301, 302. In the embodiments of the disclosure, the relative position between the device locations of the tracking devices 301, 302 may be characterized by the distance therebetween and/or the viewing angles (i.e., the directions of shooting images) thereof.

In the exemplary scenario of FIG. 3, the tracking devices 301 and 302 are assumed to shoot on opposite directions, wherein the tracking device 301 shoots toward the right, and the tracking device 302 shoots toward the left. In this case, assuming that the objects 399*a*, 399*b* face the tracking device 301 and move toward the tracking device 301, the processor 204 can estimate (according to the relative position between the device locations of the tracking devices 301, 302) that the objects 399*a*, 399*b* are getting farther away from the tracking device 302, and the tracking device 302 can only capture the backs of the objects 399*a*, 399*b*. In this case, the pose ambiguity status (e.g., the tracking confidence) of the tracking device 302 would be estimated to be low.

In addition, the processor 204 can also estimate the pose ambiguity status corresponding to the tracking device 303 based on the relative position between the device locations of the tracking devices 301, 303.

In the exemplary scenario of FIG. 3, the tracking device 303 is assumed to shoot toward the right as well. In this case, assuming that the objects 399*a*, 399*b* face the tracking device 301, the processor 204 can estimate (according to the relative position between the device locations of the tracking devices 301, 303) that the tracking device 303 can barely capture the objects 399*a*, 399*b*. In this case, the pose ambiguity status (e.g., the tracking confidence) of the tracking device 303 would be estimated to be even lower.

In step S430, the processor 204 determines at least one first specific device among the tracking devices 301-303 based on the pose ambiguity status corresponding to each of the tracking devices 301-303. Next, in step S440, the processor 204 disables the function of the at least one first specific device. In one embodiment, the processor 204 disables the tracking function while maintaining the image-capturing function of the at least one first specific device. That is, each first specific device would continue to capture images but not tracking the pose of the objects captured in the images. In some embodiments, the processor 204 can also disable other function(s) of the at least one first specific device via, for example, turning off the at least one first specific device, switching the at least one first specific device to a power saving mode, reducing image-capturing frame rate, disabling image-capturing function, and/or stopping the transmission of the local/shared map, but the disclosure is not limited thereto.

In one embodiment, the processor 204 determines at least one second specific device among the tracking devices 301-303 based on the pose ambiguity status corresponding to each of the tracking devices 301-303. Next, the processor 204 can enable or maintain the tracking function of the at least one second specific device.

In the first embodiment, the processor 204 determines whether the tracking confidence of a first tracking device (e.g., one of the tracking devices 301-303) regarding each of the objects 399*a*, 399*b* is lower than a confidence threshold. In response to determining that the tracking confidence of the first tracking device regarding each of the objects 399*a*, 399*b* is lower than the confidence threshold, the processor 204 can determine that the first tracking device belongs to the at least one first specific device. That is, if the first tracking device is not confident of the tracking performance of the captured objects, the first tracking device would be regarded as one of the first specific device whose tracking function would be disabled.

On the other hand, in response to determining that the tracking confidence of the first tracking device regarding one of the objects 399*a*, 399*b* is not lower than the confidence threshold, the processor 204 can determine that the first tracking device belongs to the at least one second specific device. That is, if the first tracking device is confident of the tracking performance of at least one of the captured objects, the first tracking device would be regarded as one of the second specific device whose tracking function would be enabled/maintained.

In the second embodiment, the processor 204 determines whether the captured part of each of the objects 399*a*, 399*b* in the image is less than a predetermined percentage of an whole body of each of the objects 399*a*, 399*b*. In response to determining that the captured part of each of the objects 399*a*, 399*b* in the image is less than the predetermined percentage of an whole body of each of the objects 399*a*, 399*b*, the processor 204 can determine that the first tracking device belongs to the at least one first specific device. That is, if the captured part of each of the objects 399*a*, 399*b* is too few, the first tracking device would be regarded as one of the first specific device whose tracking function would be disabled.

On the other hand, in response to determining that the captured part of one of the objects 399*a*, 399*b* in the image is not less than the predetermined percentage of the whole body of each of the objects 399*a*, 399*b*, the processor 204 can determine that the first tracking device belongs to the at least one second specific device. That is, if the captured part of one of the objects 399*a*, 399*b* is large enough, the first tracking device would be regarded as one of the second specific device whose tracking function would be enabled/maintained.

In the third embodiment, the processor 204 determines whether the number of the joint points of each of the objects 399*a*, 399*b* recognized in the image is less than an amount threshold. In response to determining that the number of the joint points of each of the objects 399*a*, 399*b* recognized in the image is less than the amount threshold, the processor 204 can determine that the first tracking device belongs to the at least one first specific device. That is, if the number of recognized joint points of each of the objects 399*a*, 399*b* is too few, the first tracking device would be regarded as one of the first specific device whose tracking function would be disabled.

On the other hand, in response to determining that the number of the joint points of one of the objects 399*a*, 399*b* recognized in the image is not less than the amount threshold, the processor 204 can determine that the first tracking device belongs to at least one second specific device. That is, if the number of recognized joint points of at least one of the objects 399*a*, 399*b* is high enough, the first tracking device would be regarded as one of the second specific device whose tracking function would be enabled/maintained.

In the fourth embodiment, the processor 204 determines whether the proportion of the whole body of each of the objects 399*a*, 399*b* relative to the image is less than a proportion threshold. In response to determining that the proportion of the whole body of each of the objects 399*a*, 399*b* relative to the image is less than the proportion threshold, the processor 204 can determine that the first tracking device belongs to the at least one first specific device. That is, if the whole body of each of the objects 399*a*, 399*b* is too small in the image captured by the first tracking device, the first tracking device would be regarded as one of the first specific device whose tracking function would be disabled.

On the other hand, in response to determining that the proportion of the whole body of each of the objects 399*a*, 399*b* relative to the image is not less than the proportion threshold, the processor 204 can determine that the first tracking device belongs to at least one second specific device. That is, if the whole body of at least one of the objects 399*a*, 399*b* is not too small in the image captured by the first tracking device, the first tracking device would be regarded as one of the second specific device whose tracking function would be enabled/maintained.

In one embodiment, in response to determining that a computing workload of the at least one second specific device is higher than a workload threshold, the processor 204 can enable the tracking function of at least one of the at least one first specific device. That is, when at least one of the second specific device whose tracking function is maintained/enabled is too busy, some of the first specific device whose tracking function was disabled can be enabled for reducing the computing workload, but the disclosure is not limited thereto.

In some embodiments, in response to determining that a pose ambiguity status of one second tracking device regarding a specific object is high enough, the processor 204 can assign the second tracking device to track the specific object.

In the exemplary scenario of FIG. 3, the tracking devices 301 and 302 are assumed to shoot on opposite directions, wherein the tracking device 301 shoots toward the right, and the tracking device 302 shoots toward the left. In this case, assuming that the object 399*a* faces the tracking device 301 and moves toward the tracking device 301, and the object 399*b* face the tracking device 302 and moves toward the tracking device 302, the processor 204 can assign the tracking device 301 to track the object 399*a* since the tracking confidence of the tracking device 301 regarding the object 399*a* is high (or the captured part of the object 399*a* by the tracking device 301 is high, the number of the joint points recognized on the object 399*a* is high, or the proportion of the whole body of the object 399*a* relative to the image captured by the tracking device 301 is high). Similarly, the processor 204 can assign the tracking device 302 to track the object 399*b* since the tracking confidence of the tracking device 302 regarding the object 399*b* is high (or the captured part of the object 399*b* by the tracking device 302 is high, the number of the joint points recognized on the object 399*b* is high, or the proportion of the whole body of the object 399*b* relative to the image captured by the tracking device 302 is high), but the disclosure is not limited thereto.

The disclosure further provides a computer readable storage medium for executing the method for managing tracking devices. The computer readable storage medium is composed of a plurality of program instructions (for example, a setting program instruction and a deployment program instruction) embodied therein. These program instructions can be loaded into the device manager 200 and executed by the same to execute the method for managing tracking devices and the functions of the device manager 200 described above.

In summary, the embodiments of the disclosure provide a mechanism to determine first specific device from tracking devices based the pose ambiguity status thereof and accordingly disable the tracking function of the first specific device. Since the first specific device can be understood as the devices having poor tracking performance, the computation resource of the first specific device can be saved after the tracking function is disabled. In addition, for those second specific device whose tracking function is enabled/maintained, the tracking accuracy and efficiency can be improved. Accordingly, the overall tracking performance of the tracking devices can be improved while saving a part of computation resources.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for managing tracking devices, comprising:

receiving, by a device manager, a local map corresponding to each of a plurality of tracking devices and accordingly generating a shared map, wherein the tracking devices comprise a first tracking device and a second tracking device, and step of generating the shared map comprises:

obtaining, by the device manager, a plurality of first feature points in a first local map corresponding to the first tracking device;

obtaining, by the device manager, a plurality of second feature points in a second local map corresponding to the second tracking device;

determining, by the device manager, a plurality of shared feature points between the first feature points and the second feature points; and constructing, by the device manager, the shared map based on the shared featured points;

obtaining, by the device manager, a pose ambiguity status corresponding to each of the tracking devices;

determining, by the device manager, at least one first specific device among the tracking devices based on the pose ambiguity status corresponding to each of the tracking devices; and disabling, by the device manager, at least one function of the at least one first specific device.

2. The method according to claim 1, further comprising:

providing, by the device manager, the shared map to the tracking devices, wherein the shared map comprises a device location of each of the tracking devices.

3. The method according to claim 1, wherein the pose ambiguity status corresponding to the first tracking device is characterized by a tracking confidence of the first tracking device regarding at least one object, and the method comprises:

in response to determining that the tracking confidence of the first tracking device regarding each of the at least one object is lower than a confidence threshold, determining, by the device manager, that the first tracking device belongs to the at least one first specific device;

in response to determining that the tracking confidence of the first tracking device regarding one of the at least one object is not lower than the confidence threshold, determining, by the device manager, that the first tracking device belongs to at least one second specific device.

4. The method according to claim 1, wherein the first tracking device is used to capture an image of at least one object, the pose ambiguity status corresponding to the first tracking device is characterized by a captured part of each of the at least one object in the image, and the method comprises:

in response to determining that the captured part of each of the at least one object in the image is less than a predetermined percentage of a whole body of each of the at least one object, determining, by the device manager, that the first tracking device belongs to the at least one first specific device; and in response to determining that the captured part of one of the at least one object in the image is not less than the predetermined percentage of the whole body of each of the at least one object, determining, by the device manager, that the first tracking device belongs to at least one second specific device.

5. The method according to claim 1, wherein the first tracking device is used to capture an image of at least one object, the pose ambiguity status corresponding to the first tracking device is characterized by a number of joint points of each of the at least one object recognized in the image, and the method comprises:

in response to determining that the number of the joint points of each of the at least one object recognized in the image is less than an amount threshold, determining, by the device manager, that the first tracking device belongs to the at least one first specific device; and in response to determining that the number of the joint points of one of the at least one object recognized in the image is not less than the amount threshold, determining, by the device manager, that the first tracking device belongs to at least one second specific device.

6. The method according to claim 1, wherein the first tracking device is used to capture an image of at least one object, the pose ambiguity status corresponding to the first tracking device is characterized by a proportion of a whole body the at least one object relative to the image, and the method comprises:

in response to determining that the proportion of the whole body of each of the at least one object relative to the image is less than a proportion threshold, determining, by the device manager, that the first tracking device belongs to the at least one first specific device; and in response to determining that the proportion of the whole body of each of the at least one object relative to the image is not less than the proportion threshold, determining, by the device manager, that the first tracking device belongs to at least one second specific device.

7. The method according to claim 1, wherein the step of receiving the local map corresponding to each of the tracking devices comprises:

receiving, by the device manager, the local map corresponding to each of the tracking devices forwarded by the first tracking device.

8. The method according to claim 1, wherein the step of obtaining the pose ambiguity status corresponding to each of the tracking devices comprises:

receiving, by the device manager, the pose ambiguity status determined by each of the tracking devices forwarded by the first tracking device.

9. The method according to claim 1, wherein the step of obtaining the pose ambiguity status corresponding to each of the tracking devices comprises:

obtaining the pose ambiguity status corresponding to each of the tracking devices based on the shared map.

10. The method according to claim 9, wherein the shared map comprises a device location of each of the tracking devices, the step of obtaining the pose ambiguity status corresponding to each of the tracking devices based on the shared map comprises:

receiving, by the device manager, the pose ambiguity status determined by the first tracking device;

determining a relative position between the device location of the first tracking device and the device location of the second tracking device;

estimating the pose ambiguity status corresponding to the second tracking device based on the elative position between the device location of the first tracking device and the device location of the second tracking device.

11. The method according to claim 1, wherein the pose ambiguity status corresponding to the first tracking device comprises an ambiguity of the first tracking device regarding tracking a pose of at least one object.

12. The method according to claim 1, wherein the tracking devices comprise at least one a head-mounted display.

13. The method according to claim 1, wherein the device manager is one of the tracking devices.

14. The method according to claim 1, further comprising:

determining, by the device manager, at least one second specific device among the tracking devices based on the pose ambiguity status corresponding to each of the tracking devices; and enabling or maintaining, by the device manager, a tracking function of the at least one second specific device.

15. The method according to claim 14, further comprising:

in response to determining that a computing workload of the at least one second specific device is higher than a workload threshold, enabling the tracking function of at least one of the at least one first specific device.

16. The method according to claim 1, wherein each of the tracking device has an image-capturing function and the tracking function, and the step of disabling the tracking function of the at least one first specific device comprises:

disabling the tracking function while maintaining the image-capturing function of the at least one first specific device.

17. The method according to claim 16, wherein the step of disabling the tracking function while maintaining the image-capturing function of the at least one first specific device comprises:

controlling each of the at least one first specific device to capture images but not tracking a pose of at least one object captured in the images.

18. A device manager, comprising:

a non-transitory storage circuit, storing a program code;

a processor, coupled to the storage circuit and accessing the program code to perform:

receiving a local map corresponding to each of a plurality of tracking devices and accordingly generating a shared map, wherein the tracking devices comprise a first tracking device and a second tracking device, and generating the shared map comprises:

obtaining, by the device manager, a plurality of first feature points in a first local map corresponding to the first tracking device;

obtaining, by the device manager, a plurality of second feature points in a second local map corresponding to the second tracking device;

determining, by the device manager, a plurality of shared feature points between the first feature points and the second feature points; and constructing, by the device manager, the shared map based on the shared featured points;

obtaining a pose ambiguity status corresponding to each of the tracking devices;

determining at least one first specific device among the tracking devices based on the pose ambiguity status corresponding to each of the tracking devices; and disabling at least one function of the at least one first specific device.

19. A non-transitory computer readable storage medium, the computer readable storage medium recording an executable computer program, the executable computer program being loaded by a device manager to perform steps of:

receiving a local map corresponding to each of a plurality of tracking devices and accordingly generating a shared map, wherein the tracking devices comprise a first tracking device and a second tracking device, and generating the shared map comprises:

obtaining, by the device manager, a plurality of first feature points in a first local map corresponding to the first tracking device;

obtaining, by the device manager, a plurality of second feature points in a second local map corresponding to the second tracking device;

determining, by the device manager, a plurality of shared feature points between the first feature points and the second feature points; and constructing, by the device manager, the shared map based on the shared featured points;

obtaining a pose ambiguity status corresponding to each of the tracking devices;

determining at least one first specific device among the tracking devices based on the pose ambiguity status corresponding to each of the tracking devices; and disabling at least one function of the at least one first specific device.

* * * * *